(12) United States Patent
Koiida et al.

(10) Patent No.: US 10,133,161 B2
(45) Date of Patent: Nov. 20, 2018

(54) PROJECTION DISPLAY DEVICE

(71) Applicant: NIPPON SEIKI CO., LTD., Niigata (JP)

(72) Inventors: Akinori Koiida, Niigata (JP); Yuichi Takahashi, Niigata (JP); Takuro Hirokawa, Niigata (JP); Takayuki Hatano, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 15/574,757

(22) PCT Filed: May 13, 2016

(86) PCT No.: PCT/JP2016/064321
§ 371 (c)(1),
(2) Date: Nov. 16, 2017

(87) PCT Pub. No.: WO2016/186035
PCT Pub. Date: Nov. 24, 2016

(65) Prior Publication Data
US 2018/0136548 A1 May 17, 2018

(30) Foreign Application Priority Data
May 20, 2015 (JP) ................................. 2015-103140

(51) Int. Cl.
*G03B 21/16* (2006.01)
*F21S 2/00* (2016.01)
(Continued)

(52) U.S. Cl.
CPC ............... *G03B 21/16* (2013.01); *F21S 2/00* (2013.01); *F21V 15/01* (2013.01); *F21V 29/503* (2015.01);
(Continued)

(58) Field of Classification Search
CPC ........ G03B 21/14; G03B 21/16; G03B 21/28; G03B 21/142; G03B 21/145;
(Continued)

(56) References Cited

U.S. PATENT DOCUMENTS

| | | | |
|---|---|---|---|
| 2005/0157269 A1* | 7/2005 | Seto | G03B 21/16 353/61 |
| 2006/0119805 A1* | 6/2006 | Wittenberg | G02B 7/025 353/100 |

(Continued)

FOREIGN PATENT DOCUMENTS

| | | | |
|---|---|---|---|
| JP | 2008-090163 A | 4/2008 | |
| JP | 2009-186701 A | 8/2009 | |

(Continued)

OTHER PUBLICATIONS

Search Report issued in corresponding International Patent Application No. PCT/JP2016/064321, dated Aug. 2, 2016.

*Primary Examiner* — Sultan Chowdhury
(74) *Attorney, Agent, or Firm* — McDermott Will & Emery LLP

(57) ABSTRACT

A projection display device includes a first substrate on which a red light source is mounted, a second substrate on which a green light source is mounted, a third substrate on which a blue light source is mounted, a housing to which the first through third substrates are attached, an optical member accommodated inside the housing, and a light modulating element; light emitted inside the housing from the red light source, the green light source, and the blue light source being distributed by the optical member, the distributed light being converted to a prescribed display image by the light modulating element, and the light being projected outside the housing. The first through third substrates are made of metal or of filler-containing plastic compounded with a filler having high thermal conductivity, and the housing is made (Continued)

of metal or a filler-containing plastic compounded a filler having high thermal conductivity.

7 Claims, 6 Drawing Sheets

(51) Int. Cl.
| | |
|---|---|
| *F21V 15/01* | (2006.01) |
| *H04N 9/31* | (2006.01) |
| *F21V 29/503* | (2015.01) |
| *F21V 29/507* | (2015.01) |
| *F21V 29/70* | (2015.01) |
| *F21V 29/87* | (2015.01) |
| *F21V 29/89* | (2015.01) |
| *G03B 21/20* | (2006.01) |
| *G03B 21/00* | (2006.01) |

(52) U.S. Cl.
CPC ............ *F21V 29/507* (2015.01); *F21V 29/70* (2015.01); *F21V 29/87* (2015.01); *F21V 29/89* (2015.01); *G03B 21/005* (2013.01); *G03B 21/2013* (2013.01); *G03B 21/2033* (2013.01); *G03B 21/2066* (2013.01); *H04N 9/31* (2013.01); *G03B 21/00* (2013.01)

(58) Field of Classification Search
CPC ............ G03B 21/2013; G03B 21/2033; H04N 9/3144; H04N 9/3161; H04N 9/3164
See application file for complete search history.

(56) References Cited

U.S. PATENT DOCUMENTS

| | | | |
|---|---|---|---|
| 2006/0139580 A1* | 6/2006 | Conner | G02B 27/0994 353/98 |
| 2008/0187303 A1 | 8/2008 | Ito | |
| 2009/0231846 A1 | 9/2009 | Nakajima | |
| 2011/0280270 A1* | 11/2011 | Hayashi | H01S 5/02216 372/50.1 |
| 2012/0293774 A1* | 11/2012 | Inoue | G02B 13/04 353/31 |
| 2014/0362350 A1* | 12/2014 | Takamatsu | G02B 19/0023 353/31 |

FOREIGN PATENT DOCUMENTS

| | | |
|---|---|---|
| JP | 2014-149369 A | 8/2014 |
| WO | 2008/069143 A1 | 6/2008 |

* cited by examiner

[Fig.1]
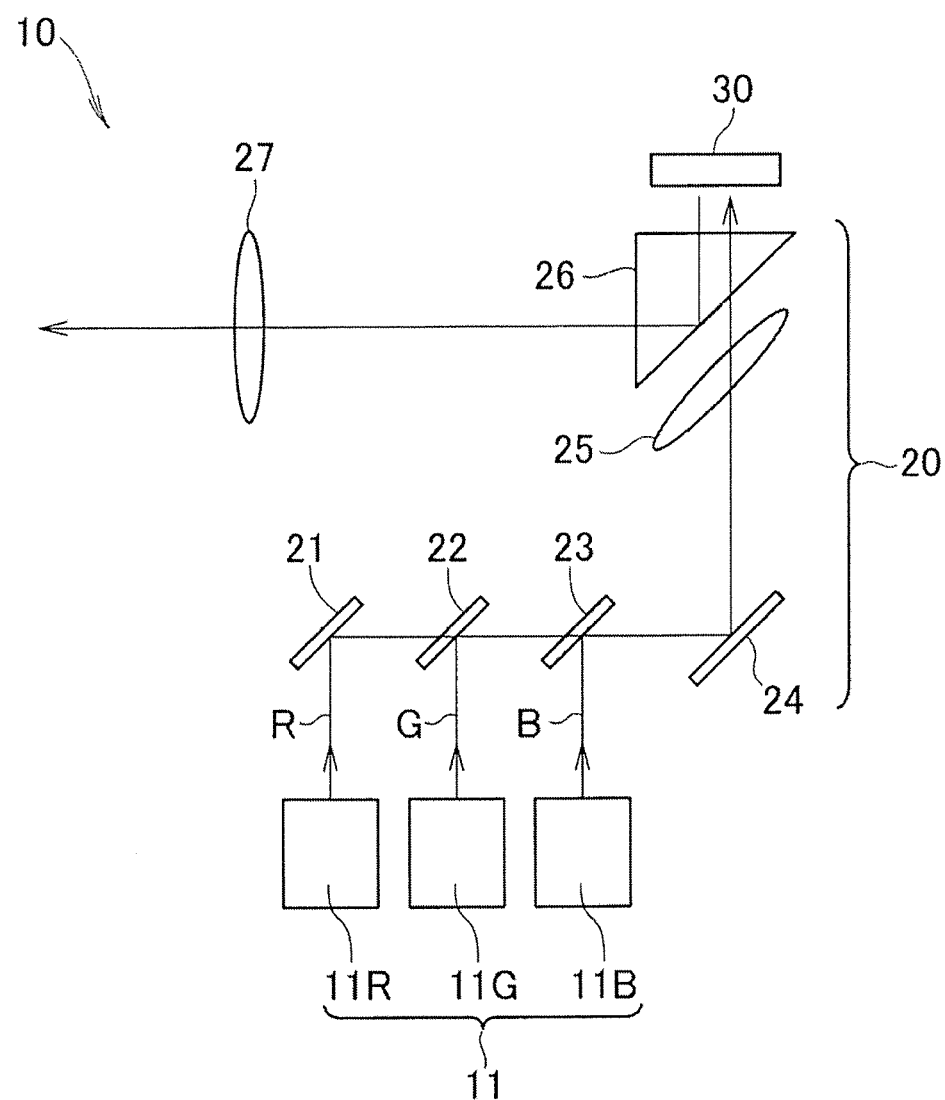

[Fig.2]
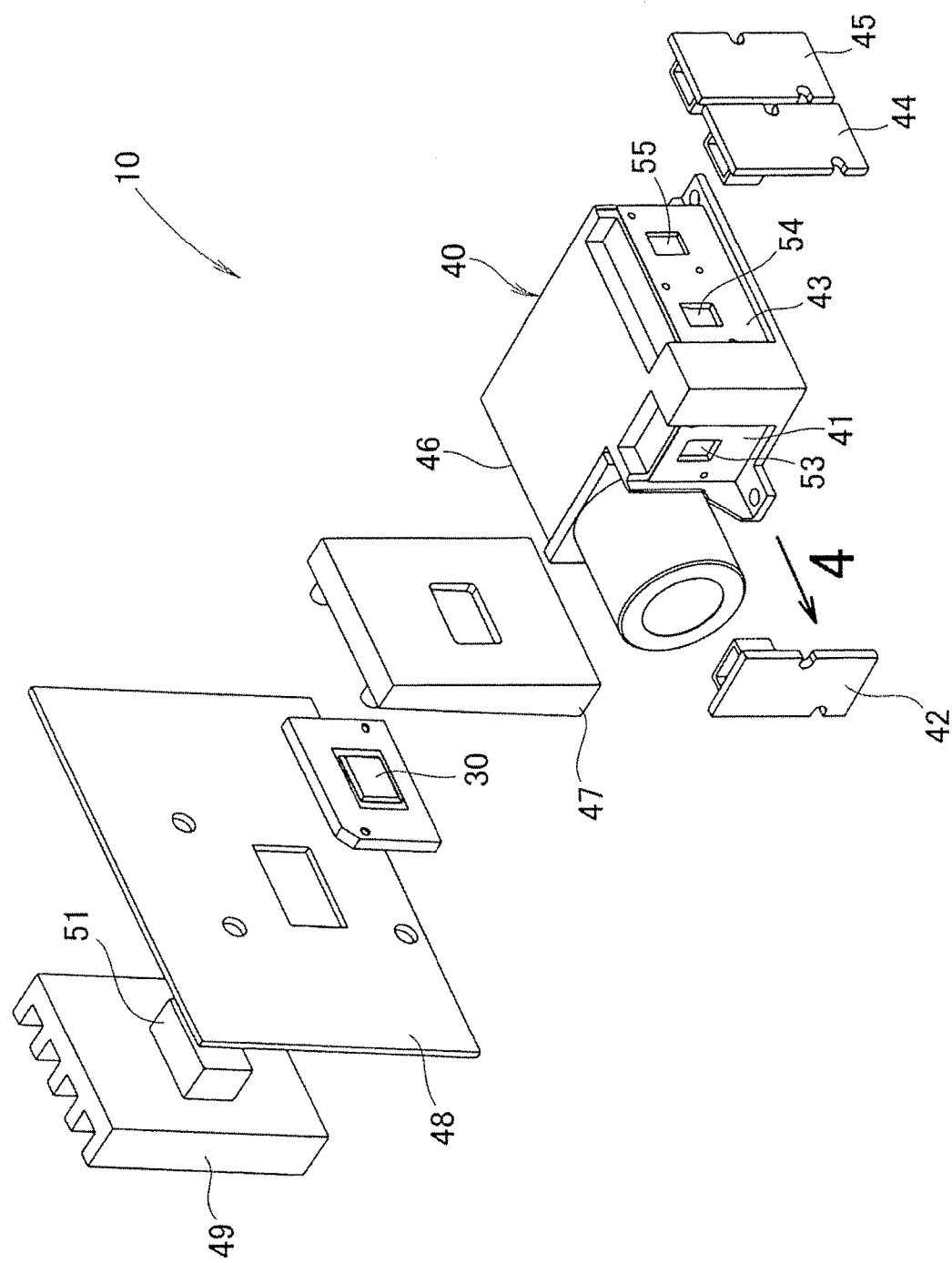

[Fig.3]
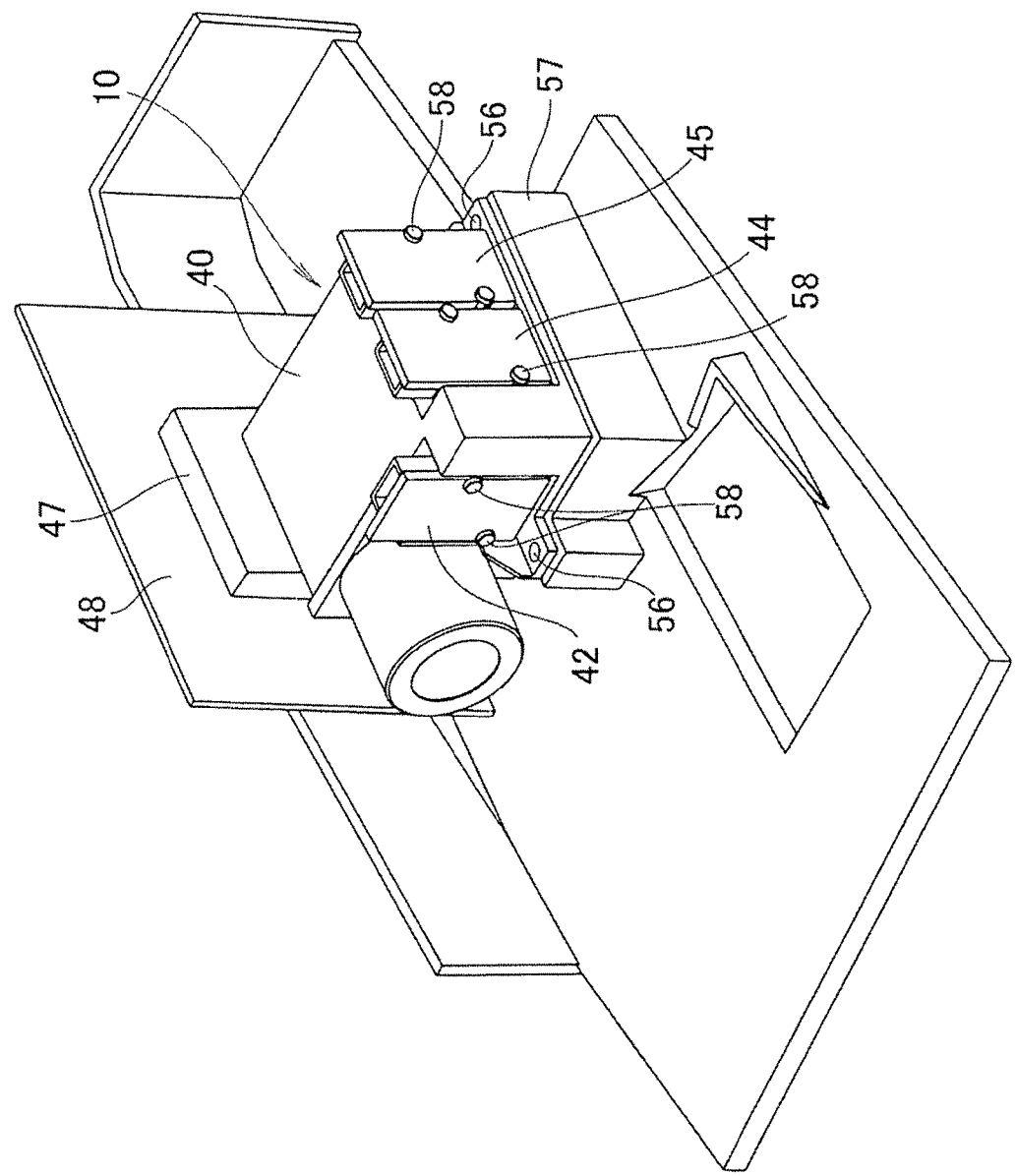

[Fig.4]
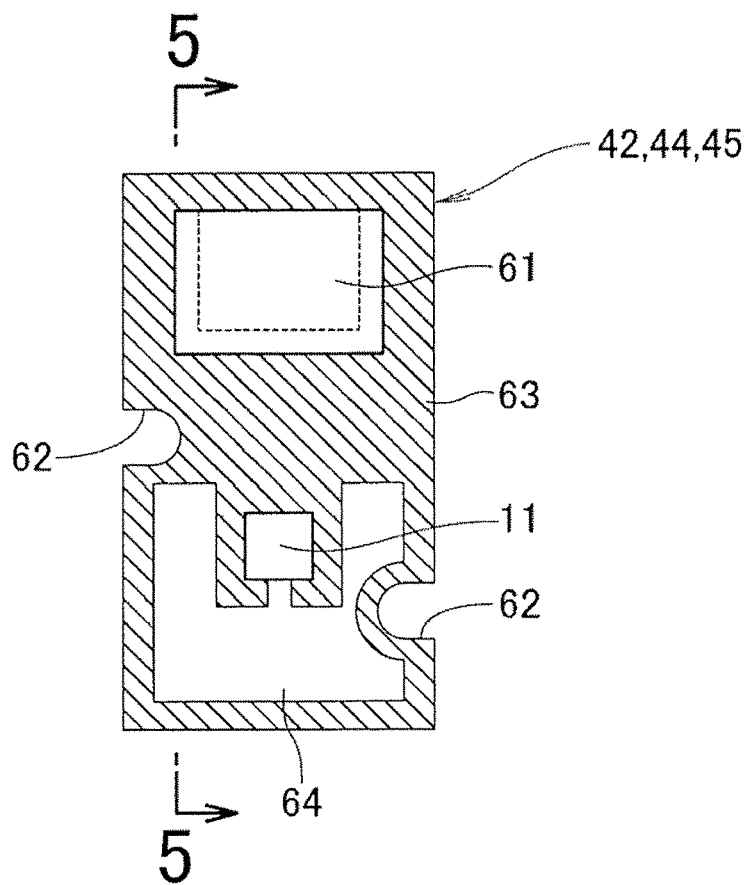
[Fig.5]
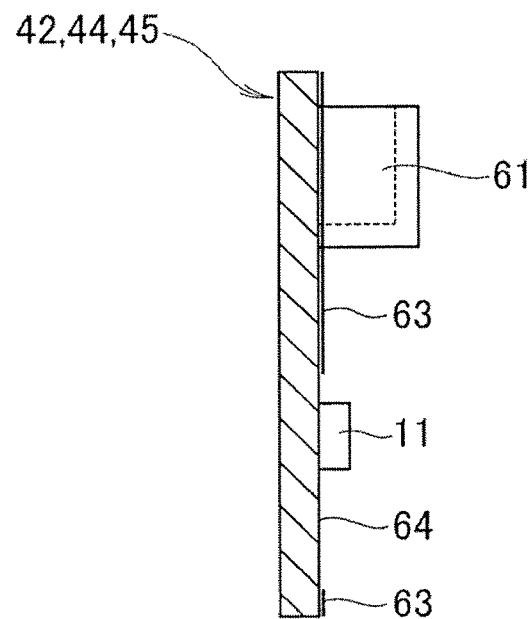

[Fig.6]
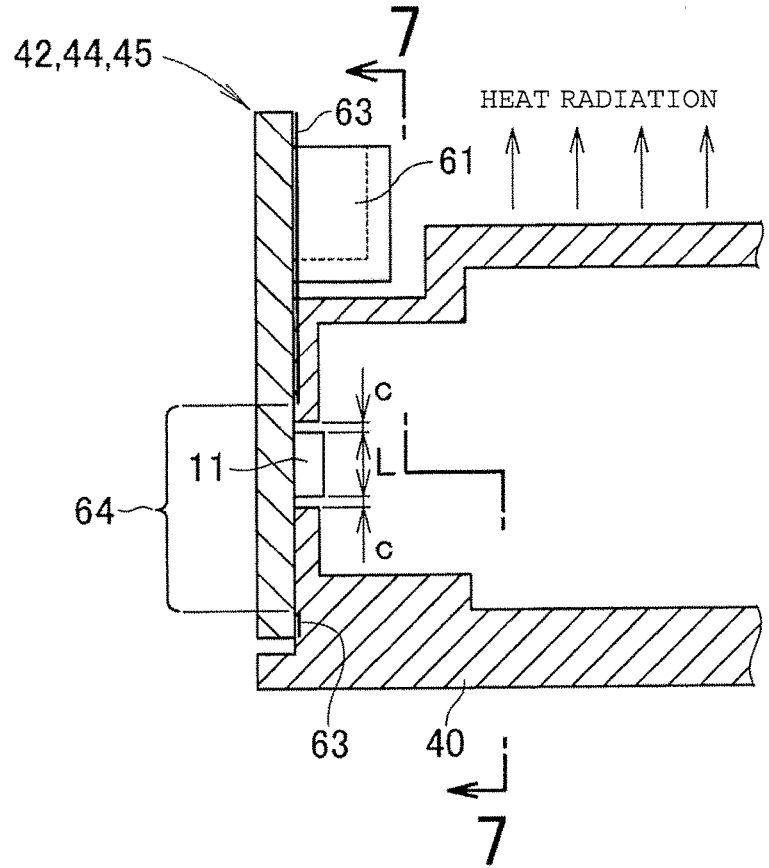
[Fig.7]
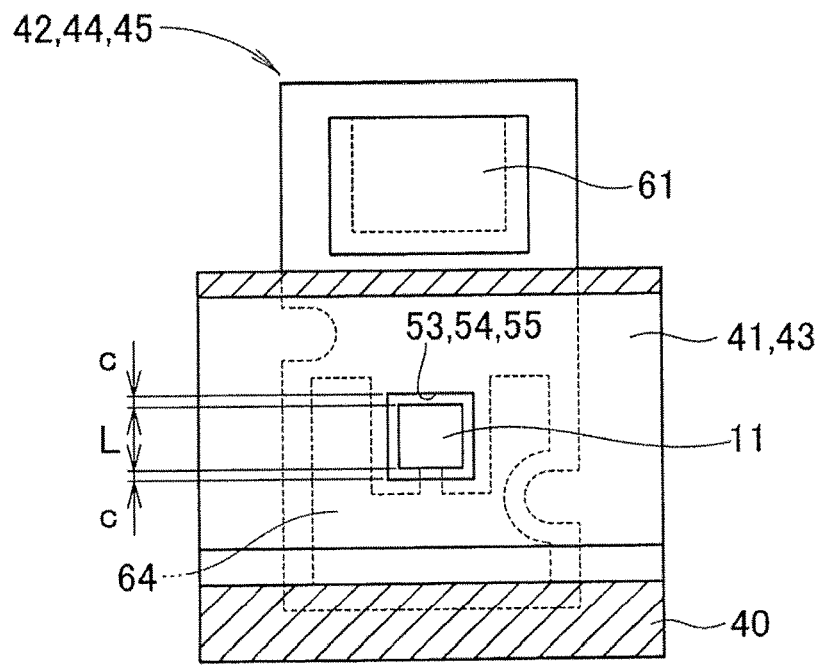

[Fig.8]
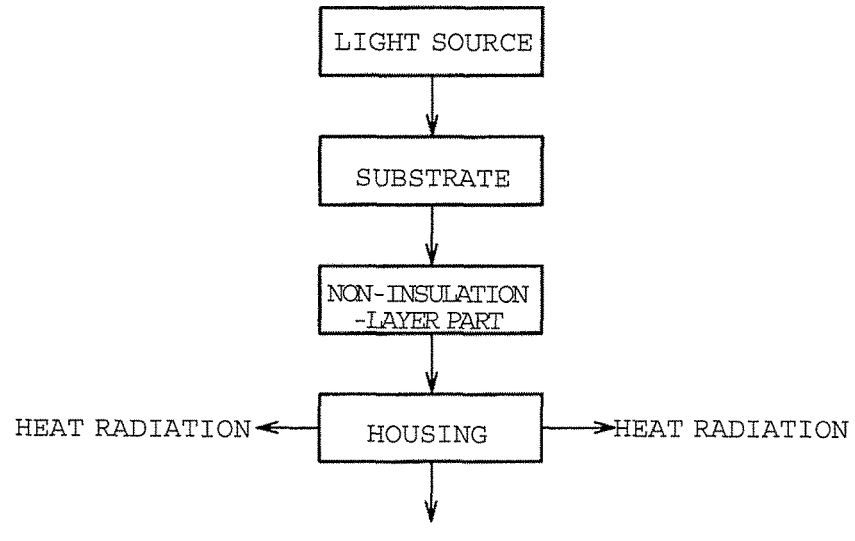
(a)
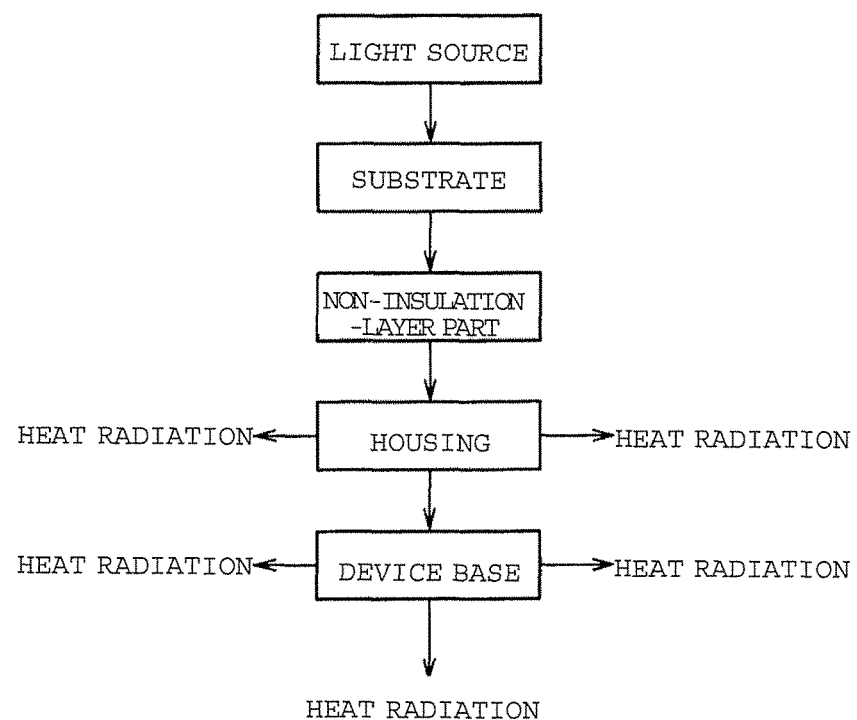
(b)

PROJECTION DISPLAY DEVICE

CROSS REFERENCE

This application is the U.S. National Phase under 35 U.S.C. § 371 of International Application No. PCT/JP2016/064321, filed on May 13, 2016, which claims the benefit of Japanese Application No. 2015-103140, filed on May 20, 2015, the entire contents of each are hereby incorporated by reference.

TECHNICAL FIELD

The present invention relates to a projection display device and, more particularly, to a projection display device capable of radiating heat generated by a light source more smoothly.

BACKGROUND ART

A projection display device projects light information emitted from an illumination optical system onto a screen or the like. A light source that is the main element of an illumination optical system is also a heating element, so heat radiation measure is necessary.

Accordingly, projection display devices having various types of heat radiation measure have been proposed (see, for example, PTL 1 (FIGS. 2 and 5)).

As illustrated in FIG. 5 of PTL 1, a projection display device (100) includes a light source (121), a housing (103) in which the light source (121) is accommodated, a cover plate (107) covering the housing (103), and a light source radiating member (104) attached to the cover plate (107). (Numerals enclosed by parentheses indicate symbols described in PTL 1. This is the same in the following description.)

Heat generated by the light source (121) is radiated to the air via the light source radiating member (104).

However, as illustrated in FIG. 2 of PTL 1, the size of the light source radiating member (104) is sufficiently large with respect to the size of the projection display device (100). Since the light source radiating member (104) is large, the projection display device (100) becomes necessarily large, the weight increases, and the product cost also increases.

Since a small-sized projection display device is requested, a projection display device that can be small-sized while keeping heat radiation performance is desired.

CITATION LIST

Patent Literature

PTL 1: JP-A-2014-149369

SUMMARY OF INVENTION

Technical Problem

An object of the invention is to provide a projection display device that can be small-sized while keeping heat radiation performance.

Solution to Problem

According to claim 1 of the invention, there is provided a projection display device including a first substrate on which a red light source is mounted, a second substrate on which a green light source is mounted, a third substrate on which a blue light source is mounted, a housing to which the first to third substrates are attached, an optical member accommodated in the housing, and a light modulating element attached to the housing, light emitted into the housing from the red light source, the green light source, and the blue light source being distributed by the optical member, the distributed light being converted to a prescribed display image by the light modulating element and projected externally from the housing, in which the first to third substrates are made of metal or filler-containing plastic compounded with a filler having a high thermal conductivity, and the housing is made of metal or filler-containing plastic compounded with a filler having a high thermal conductivity.

It should be noted that "high thermal conductivity" means the thermal conductivity tens to hundreds of times larger than that of resin.

In claim 2 of the invention, the metal is aluminum alloy or magnesium alloy.

In claim 3 of the invention, the housing has window portions through which the red light source, the green light source, and the blue light are seen from an inside of the housing and the window portions have sizes obtained by adding prescribed clearances to outside dimensions of the light sources.

In claim 4 of the invention, parts of surfaces of the first to third substrates are covered with insulation layers having good electric insulation, the other parts of the surfaces are non-insulation-layer parts, and the non-insulation-layer parts are in contact with the housing.

Advantageous Effects of Invention

In claim 1 of the invention, the first to third substrates supporting the light sources are made of metal or filler-containing plastic compounded with a filler having a high thermal conductivity and the housing supporting the first to third substrates is also made of metal or filler-containing plastic compounded with a filler having a high thermal conductivity. Heat generated by the light sources is conducted to the substrates and then the housing. Since the outer surface area of the housing is large, heat is actively radiated from the housing to the air. That is, since a special light source radiating member can be omitted, the size, the weight, and the cost of the projection display device can be reduced.

In claim 2 of the invention, the metal is aluminum alloy or magnesium alloy.

As is well known, the thermal conductivity of aluminum is 3.8 and the thermal conductivity of magnesium is 3.1 when the thermal conductivity of carbon steel is assumed to be 1. The density (specific gravity) of aluminum is 0.34 and the density of magnesium is 0.22 when the density of carbon steel is assumed to be 1.

The thermal conductivities of aluminum alloy and magnesium alloy are much larger than that of carbon steel, which is a typical example of metal. In addition, since the specific gravities of aluminum alloy and magnesium alloy are much lower than that of carbon steel, the weight of projection display device can be reduced.

In claim 3 of the invention, the window portions have sizes obtained by adding prescribed clearances to the outer dimensions of the light sources. When the substrates are in contact with the housing, the contact areas between the substrates and the housing are reduced as the sizes of the window portions are large. However, the invention minimizes the sizes of the window portions by making the sizes of the window portions substantially the same as the outer dimensions of the light sources and increases the contact areas between the substrates and the housing. As a result, the amount of heat conduction from the substrates to the housing can be increased.

In claim 4 of the invention, parts of the surfaces of the first to third substrates are covered with insulation layers having good electric insulation, the other parts of the surfaces are non-insulation-layer parts, and the non-insulation-layer parts are in contact with the housing.

The insulation layers having good electric insulation generally have good thermal insulation. There is concern about reduction in the amount of heat conduction by the insulation layers.

Since non-insulation-layer parts are provided on the substrate and the non-insulation-layer parts are in contact with the housing in the invention, the amount of heat conduction from the substrates to the housing can be increased.

BRIEF DESCRIPTION OF DRAWINGS

FIG. 1 illustrates the basic structure of a projection display device according to the invention.

FIG. 2 is an exploded perspective view illustrating the projection display device.

FIG. 3 is a perspective view illustrating the projection display device having been assembled.

FIG. 4 is a front view illustrating the substrate seen from arrow 4 in FIG. 2.

FIG. 5 is a cross sectional view taken along line 5-5 in FIG. 4 and illustrates the substrate.

FIG. 6 is a cross sectional view illustrating the part in which the substrates are attached to the housing.

FIG. 7 is a cross sectional view taken along line 7-7 in FIG. 6.

FIG. 8(*a*) and FIG. 8(*b*) illustrate how heat is conducted.

DESCRIPTION OF EMBODIMENTS

An embodiment of the invention will be described below with reference to the attached drawings.

EXAMPLES

As illustrated in FIG. 1, a projection display device 10 includes, as main elements, a red light source 11R (reference numeral 11 represents a light source (this is the same in the following description) and R is an index representing red) for emitting a red light beam R, a green light source 11G (G is an index representing green) for emitting a green light beam G, a blue light source 11B (B is an index representing blue) for emitting a blue light beam B, an optical member 20 for distributing the light beams R, G, and B, and a light modulating element 30 for obtaining a prescribed display image based on the distributed light.

The optical member 20 includes, for example, a mirror 21, dichroic mirrors 22 and 23, a reflecting mirror 24, a convex lens 25, a prism 26, a projection lens 27, and the like.

The red light beam R is reflected by the mirror 21 and the reflected light passes through the dichroic mirrors 22 and 23 and is directed to the reflecting mirror 24.

The green light beam G is reflected by the dichroic mirror 22 and the reflected light passes through the dichroic mirror 23 and is directed to the reflecting mirror 24.

The blue light beam B is reflected by the dichroic mirror 23 and the reflected light is directed to the reflecting mirror 24.

The light beams R, G, and B are reflected by the reflecting mirror 24, distributed by the convex lens 25, pass through the prism 26, and reaches the light modulating element 30 called DMD. The light beams are converted to a prescribed display image by the light modulating element 30. The converted image information is reflected by the prism 26 and the reflected image information passes through the projection lens 27 and is projected (exits).

Light emitting diodes having the amount of heat generation less than conventional electric bulbs are preferable as the light source 11 for emitting the light beams R, G, and B. However, even light emitting diodes generate heat. It is necessary to suppress increase in the temperature of the light source 11 by promoting heat exhaust.

As illustrated in FIG. 2, the projection display device 10 includes a housing 40 in which the optical member 20 illustrated in FIG. 1 is accommodated, a first substrate 42, attached to a first wall 41 of the housing 40, on which the red light source (reference numeral 11R in FIG. 1) is mounted, a second substrate 44, attached to a second wall 43 of the housing 40, on which the green light source (reference numeral 11G in FIG. 1) is mounted, a third substrate 45, attached to the second wall 43 of the housing 40, on which the blue light source (reference numeral 11B in FIG. 1) is mounted, a spacer 47 attached to a third wall 46 of the housing, the light modulating element 30 in contact with the spacer 47, a control substrate 48 for controlling the light modulating element 30 by electrically connecting to the light modulating element 30 while being pushed against the light modulating element 30, and a heat sink 49 attached to the control substrate 48.

The heat sink 49 has a projection 51, which passes through the control substrate 48 and makes contact with the back surface of the light modulating element 30. Accordingly, heat of the light modulating element 30 is conducted to the heat sink 49 via the projection 51 and radiated to the air from the heat sink 49. As a result, increase in the temperature of the light modulating element 30 is suppressed.

The housing 40 is made of metal or filler-containing plastic compounded with a filler having a high thermal conductivity.

The first wall 41 of the housing 40 has a rectangular first window portion 53 and the rectangular second wall 43 has a rectangular second window portion 54 and a rectangular third window portion 55.

It should be noted that the housing 40 may be formed in any shape. In addition, the three substrates 42, 44, and 45 may be attached to a common wall (for example, the second wall 43) or the three substrates 42, 44, and 45 may be attached to different walls. That is, the layout of the three substrates 42, 44, and 45 with respect to the housing 40 is arbitrary.

As illustrated in FIG. 3, the projection display device 10 is fixed to a device base 57 via screws 56 and 56. The projection display device 10 may be bonded and fixed to the device base 57.

The device base 57 is desirably made of metal including aluminum alloy or carbon steel. In addition, the first to third substrates 42, 44, and 45 are attached to the housing 40 via screws 58 in a detachable manner.

As illustrated in FIG. 4, each of the first to third substrates 42, 44, and 45 is rectangular, has the light source 11 in the lower part thereof, a socket part 61 in the upper part thereof, and cut holes 62 and 62 for screwing in the left and right edges. Although the front surface is covered with an insulation layer 63 having good electric insulation, the light source 11 is surrounded by a non-insulation-layer part 64 not including the insulation layer 63. Although the non-insulation-layer part 64 is W-shaped in this example, the non-insulation-layer part 64 may have any shape.

As illustrated in FIG. 5, although the front surface of each of the first to third substrates 42, 44, and 45 is covered with the insulation layer 63, the light source 11 is surrounded by the non-insulation-layer part 64. Although an epoxy resin film with a thickness of approximately 20 µm is preferable as the insulation layer 63, the thickness and the material are arbitrary. It should be noted that the insulation layer 63 may be attached to the back surface of each of the first to third substrates 42, 44, and 45.

The first to third substrates 42, 44, and 45 are made of metal or filler-containing plastic compounded with a filler having a high thermal conductivity.

As illustrated in FIG. 7, which is a cross sectional view taken along line 7-7 in FIG. 6, the light source 11 can be seen through the window portions 53, 54, and 55 from the inside of the housing 40. The window portions 53, 54, and 55 have the sizes obtained by adding prescribed clearances c to the outside dimension L of the light source 11 (that is, (L+c+c)). The clearance c preferably ranges from 0.3 mm to 1.0 mm. Since the sizes of the window portions 53, 54, and 55 are minimized, the entire non-insulation-layer part 64 makes contact with the walls 41 and 43.

In FIG. 6, the housing 40 is made of metal or filler-containing plastic compounded with a filler having a high thermal conductivity.

The substrates 42, 44, and 45 are also made of metal or filler-containing plastic compounded with a filler having a high thermal conductivity.

TABLE 1

|  | Material | Thermal conductivity | Ratio |
| --- | --- | --- | --- |
| Comparative example | Polycarbonate resin | 0.23 W/mk | 1.0 |
| Example 1 | Aluminum casting (ADC12) | 96 W/mk | 417 |
| Example 2 | Magnesium casting | 48 W/mk | 209 |
| Example 3 | filler-containing plastic (including carbon fiber) | Approx. 10 W/mk | Approx. 43 |

The polycarbonate (PC) resin adopted as the comparative example has a thermal conductivity of 0.23 W/mK.

The aluminum casting (ADC12) in example 1 has a thermal conductivity 417 times larger than that of the PC resin.

The magnesium casting in example 2 has a thermal conductivity 209 times larger than that of the PC resin.

The filler-containing plastic in example 3 has a thermal conductivity 43 times larger than that of the PC resin. Although carbon fiber is preferable as the filler, the type is not limited as long as the material has a thermal conductivity higher than resin, such as a fine copper wire, a copper mesh, copper powder, or graphite powder.

In FIG. 6, heat of the light source 11 is conducted to the substrates 42, 44, and 45. Heat of the substrate 42, 44, and 45 is conducted to the housing 40. In the example, heat is conducted to the housing 40 via the non-insulation-layer part 64. Heat of the housing 40 is radiated to the air by convective heat conduction. At this time, since the substrates 42, 44, and 45 and the housing 40 are formed by a good heat conductive material, a flow of heat increases. As a result, the temperature of the light source 11 is prevented from becoming high.

That is, as illustrated in FIG. 8(a), heat of "LIGHT SOURCE" is conducted to "SUBSTRATE", heat of "SUBSTRATE" is conducted to "HOUSING" via "NON-INSULATION-LAYER PART". Then, heat is radiated from the outer surface (particularly, the upper surface and the side surfaces) of "HOUSING" to the air. Since heat is not trapped, the temperature of the light source is reduced.

Since "HOUSING" functions as a heat sink, increase in the temperature of the heat source can be suppressed without providing a special heat sink.

By the way, in the case of a box, convective heat conduction from the upper surface (ceiling) to above is large. Convective heat conduction from the side surfaces (walls) to the side is smaller than this. Convective heat conduction from the bottom surface is smaller than in the upper surface and the side surfaces.

Accordingly, as illustrated in FIG. 3, the housing 40 is placed on the device base 57. Then, heat is conducted from the housing 40 to the device base 57. This heat conduction is not affected by the orientation.

Although the temperature of the device base 57 becomes high, since the device base 57 has the side surfaces and the upper surface, convective heat conduction from the side surfaces and the upper surface can be expected. That is, in FIG. 3, radiation from the device base 57 is added to radiation from the upper surface and the walls of the housing 40.

That is, as illustrated in FIG. 8(b), heat of "LIGHT SOURCE" is conducted to "SUBSTRATE", heat of "SUBSTRATE" is conducted to "HOUSING" via "NON-INSULATION-LAYER PART", and heat of "HOUSING" is conducted to "DEVICE BASE". Then, heat is radiated from the outer surface (particularly, the upper surface and the side surfaces) of "HOUSING" to the air and radiated from the device base to the air. Since heat is not trapped, the temperature of the light source is reduced.

Although the first substrate 42 on which the red light source 11R is mounted, the second substrate 43 on which the green light source 11G is mounted, and the third substrate 44 on which the blue light source 11B is mounted are different substrates in the above embodiment, part or all of the first substrate 42, the second substrate 43, and the third substrate 44 may be shared. That is, the light sources of two colors or three colors may be mounted on one substrate.

It should be noted that the projection display device 10 is applicable to a project disposed in a conference room or the like in addition to an in-vehicle device installed in a vehicle and the use is not specially limited.

In addition, a part of the housing may be made of metal and the other part may be made of filler-containing plastic. Alternatively, a part of the housing may be made of filler-containing plastic or metal and the other part may be made of general resin. That is, the part of the housing for which heat conduction performance is necessary may be made of filler-containing plastic or metal. This is true for the substrates.

INDUSTRIAL APPLICABILITY

The projection display device according to the invention is preferable for an in-vehicle device installed in a vehicle.

REFERENCE SIGNS LIST

10: projection display device
11: light source
11R: red light source

11G: green light source
11B: blue light source
20: optical member
30: light modulating element
40: housing
42: first substrate
44: second substra
45: third substrate
53 to 55: window portion
L: outside dimension of light source
c: prescribed clearance

The invention claimed is:

1. A projection display device comprising:
a first substrate on which a red light source is mounted, the red light source mounted on a surface of the first substrate;
a second substrate on which a green light source is mounted, the green light source mounted on a surface of the second substrate;
a third substrate on which a blue light source is mounted, the blue light source mounted on a surface of the third substrate; and
a housing comprising:
walls comprising a first window, a second window, and a third window,
wherein the surface of the first substrate is in contact with outer surfaces of the walls allowing the red light source mounted on the surface of the first substrate to enter the housing through the first window,
wherein the surface of the second substrate is in contact with the outer surfaces of the walls allowing the green light source mounted on the surface of the second substrate to enter the housing through the second window, and
wherein the surface of the third substrate is in contact with the outer surfaces of the walls allowing the blue light source mounted on the surface of the third substrate to enter the housing through the third window;
an optical member 1) receiving light from the red light source, the green light source, and the blue light source and 2) guiding the light to a light modulating element; and
the light modulating element converting the guided light to a prescribed display image and projecting the prescribed display image to outside the housing,
wherein the first substrate, the second substrate, and the third substrate are made of metal or filler-containing plastic compounded with a filler having a first high thermal conductivity, and
wherein the housing is made of metal or filler-containing plastic compounded with a filler having a second high thermal conductivity.

2. The projection display device according to claim 1, wherein the metal is aluminum alloy or magnesium alloy.

3. The projection display device according to claim 2, wherein each of the surface of the first substrate, the surface of the second substrate, and the surface of the third substrate comprises 1) a first part being covered with an insulation layer, and 2) a second part being covered with a non-insulation-layer, and
wherein the second part covered with the non-insulation-layer in each of the surface of the first substrate, the surface of the second substrate, and the surface of the third substrate is in contact with the wall surfaces of the housing.

4. The projection display device according to claim 1, wherein each of the surface of the first substrate, the surface of the second substrate, and the surface of the third substrate comprises 1) a first part being covered with an insulation layer, and 2) a second part being covered with a non-insulation-layer, and
wherein the second part covered with the non-insulation-layer in each of the surface of the first substrate, the surface of the second substrate, and the surface of the third substrate is in contact with the wall surfaces of the housing.

5. A projection display device comprising:
a first substrate on which a red light source is mounted;
a second substrate on which a green light source is mounted;
a third substrate on which a blue light source is mounted; and
a housing comprising:
walls comprising a first window, a second window, and a third window,
wherein the first substrate is attached to the walls of the housing allowing the red light source on the first substrate to be inserted through the first window from outside of the housing into inside of the housing so that a part of the red light source is disposed within the housing,
wherein the second substrate is attached to the walls of the housing allowing the green light source on the second substrate to be inserted through the second window from outside of the housing into inside of the housing so that a part of the green light source is disposed within the housing, and
wherein the third substrate is attached to the walls of the housing allowing the blue light source on the third substrate to be inserted through the third window from outside of the housing into inside of the housing so that a part of the blue light source is disposed within the housing;
an optical member 1) receiving light from the red light source, the green light source, and the blue light source and 2) guiding the light to a light modulating element; and
the light modulating element converting the guided light to a prescribed display image and projecting the prescribed display image to outside the housing.

6. A projection display device comprising:
a first substrate having a surface on which a red light source is mounted;
a second substrate having a surface on which a green light source is mounted;
a third substrate having a surface on which a blue light source is mounted; and
a housing comprising:
wall surfaces, wherein the surface of the first substrate, the surface of the second substrate, and the surface of the third substrate are in contact with the wall surfaces of the housing;
an optical member 1) receiving light from the red light source, the green light source, and the blue light source and 2) guiding the light to a light modulating element; and
the light modulating element converting the guided light to a prescribed display image and projecting the prescribed display image to outside the housing,
wherein each of the surface of the first substrate, the surface of the second substrate, and the surface of the third substrate comprises 1) a first part being covered with an insulation layer, and 2) a second part being covered with a non-insulation layer, and wherein the second part covered with the non-insulation-layer in each of the surface of the first substrate, the surface of the second substrate, and the surface of the third substrate is in contact with the wall surfaces of the housing.

7. The projection display device according to claim 6, wherein the wall surfaces of the housing comprise a first window, a second window, and a third window, wherein the first window allows the red light source on the surface of the first substrate to be inserted from outside of the housing into inside of the housing so that a part of the red light source is disposed within the housing, wherein the second window allows the green light source on the surface of the second substrate to be inserted from outside of the housing into inside of the housing so that a part of the green light source is disposed within the housing, and wherein the third window allows the blue light source on the surface of the third substrate to be inserted from outside of the housing into inside of the housing so that a part of the blue light source is disposed within the housing.

\* \* \* \* \*